United States Patent [19]

Schoenman

[11] Patent Number: 4,882,904
[45] Date of Patent: Nov. 28, 1989

[54] TWO STAGE ROCKET COMBUSTOR

[75] Inventor: Leonard Schoenman, Citrus Heights, Calif.

[73] Assignee: Aerojet-General Corporation, La Jolla, Calif.

[21] Appl. No.: 172,622

[22] Filed: Mar. 24, 1988

[51] Int. Cl.⁴ .............................................. F02K 9/42
[52] U.S. Cl. ....................................... 60/258; 60/265
[58] Field of Search ................. 60/257, 258, 260, 265, 60/732, 753, 755, 756, 757; 239/DIG. 19

[56] References Cited

U.S. PATENT DOCUMENTS

| | | | |
|---|---|---|---|
| 2,523,656 | 9/1950 | Goddard | 60/258 |
| 3,254,485 | 6/1966 | Bernstein | 60/258 |
| 3,303,654 | 2/1967 | Bringer | 60/265 |
| 3,354,651 | 11/1967 | Novotny | 60/258 |
| 3,712,059 | 1/1973 | Drexhage | 60/258 |

Primary Examiner—Louis J. Casaregola
Attorney, Agent, or Firm—Townsend and Townsend

[57] ABSTRACT

A method for operating a rocket engine by injecting fuel and oxidizer into an elongated combustion chamber in two flows, a core flow where the fuel and oxidizer are intimately mixed and immediately combusted and a peripheral curtain flow which surrounds the core flow and which is in contact with the combustion chamber wall to cool it and limit the heat transfer from the wall to the injector to prevent vapor locks in the injector. To prevent decomposed or partially combusted propellant products from chemically reacting with the chamber wall no mixing of fuel and oxidizer takes place in the curtain flow. The curtain flow is deflected radially inward into the core flow, before decomposed or partially combusted products can come into contact with the wall, into the core flow to fully combust the curtain flow out of contact with the wall. The rocket engine is defined by serially arranged first and second combustion chambers and an injector constructed to from the core and curtain flows. A ring plate projects radially inward at the downstream end of the first chamber and deflects the curtain flow into the coreflow.

10 Claims, 1 Drawing Sheet

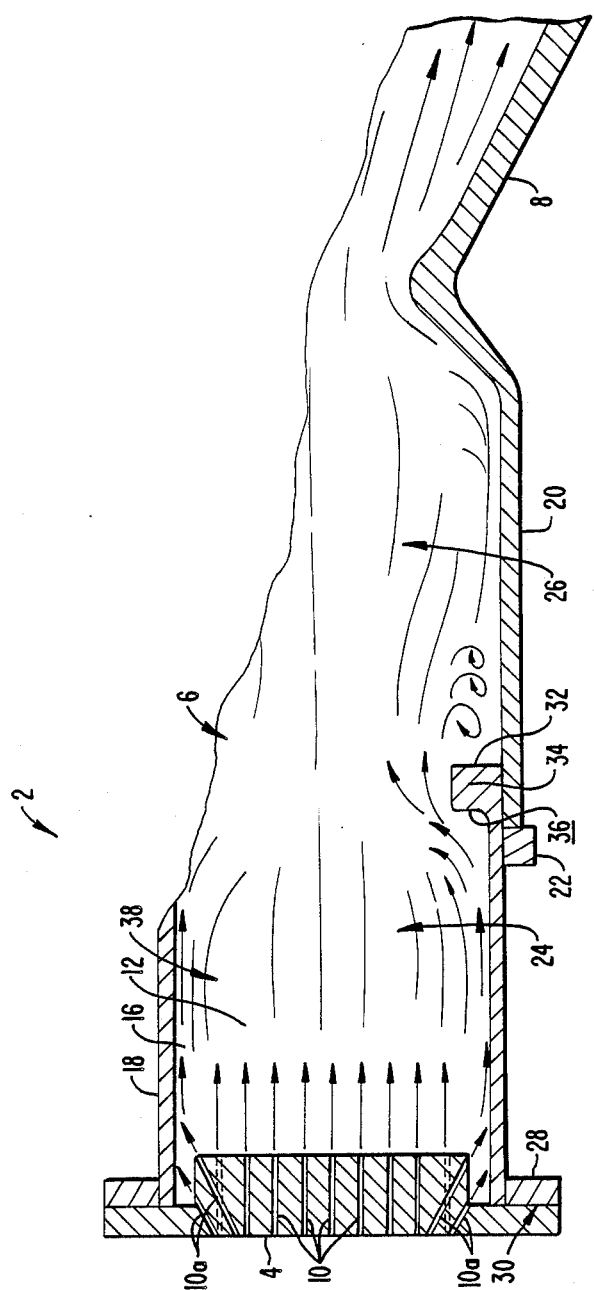

TWO STAGE ROCKET COMBUSTOR

BACKGROUND OF THE INVENTION

A conventional liquid fuel rocket engine has a propellant (fuel and oxidizer) injector and a nozzle shaped combustion chamber into which the propellant is injected and where its constituents are mixed and oxidized or combusted.

There are a number of proven fuel and oxidizer combinations, each with specific performance characteristics. They differ in the amount of energy released when they combust and in the thermodynamics of their reactions. By the nature of their reactions all the propellant combinations are exothermic, that is, once the fuel and oxidizer are mixed, the reaction is initiated and energy is released. Once the reaction has been initiated, the release of energy from the propellant combination will drive the reaction.

The efficiency of the reaction, that is, the degree to which both propellant components are completely reacted, is largely dependent on the thoroughness of the mixing of the two components. Incomplete mixing results in unreacted fuel or oxidizer and a corresponding loss in efficiency.

The propellant injector of the rocket engine implements the mixing of the fuel and oxidizer components of the propellant. A typical injector can have from several to several thousand orifices through which the fuel and oxidizer are introduced into the combustion chamber. The orifices direct the fuel and the oxidizer so that they form spray fans which mix and commence combustion at preselected points within the combustion chamber, typically immediately down stream of the injector. Numerous orifice arrangements which form fuel only, oxidizer only or bipropellant fans exist.

The combustion of rocket propellant generates gas temperatures which generally exceeds the melting temperature of most known materials used in the construction of chamber walls. Without cooling the chamber walls would deteriorate and ultimately melt.

Further, the heating of the combustion chamber walls can lead to an overheating of the injector as a result of heat transfer between them via their interface. This can result in a vapor lock in the injector, and engine failure.

There are two main approaches to cooling the combustion chamber walls of a rocket engine. Regenerative cooling circulates one or both of the propellant components through the walls of the chamber. The propellant component acts as a coolant and carries away the heat which is eventually returned to the combination gases. The approach has only limited utility. It can not provide sufficient cooling for small engines because their propellant flow is too low and this approach may not be suited for use with large, high-pressure engines for other reasons.

The other often practiced approach employs film cooling in which the orifice pattern of the propellant injector generates two propellant flows, a central core flow and a peripheral or curtain flow which surrounds or envelopes the core flow. In the core flow the propellant is well mixed and combusted in the core which is some distance radially inward of the chamber wall. The cooler curtain is formed by unmixed and therefore uncombusted propellant directed by injector orifices toward the chamber walls. The unmixed propellant forms a cool gas film or curtain over the chamber wall which separates it from the very hot core flow. The film absorbs heat by evaporation of the small fuel and/or oxidizer droplets ejected by the injector and thus insulates the combustion chamber wall from the heat of the core flow. This method can be used with most rocket engines but the film of uncombined propellant in contact with the combustion chamber wall is disadvantageous.

The propellant film evaporates and decomposes from its exposure to the heat. Decomposition products react with unmixed propellant to create a variety of aggressive chemical species which can chemically react with typical chamber wall materials such as copper, nickel, platinum, iridium, gold, rhenium and columbium. This corrodes and deteriorates the chamber wall and can lead to its failure.

Further, the propellant film can undergo spontaneous thermal decomposition, resulting in transient species which can be the source of additional chemical attack on the combustion chamber wall.

Partially mixed propellant can result in localized concentrations of fuel and oxidizer existing side by side. The boundaries between these concentrations create an environment where a spectrum of combustion chemistry species are generated, including many nonequilibrium species not normally found in other combustion devices. When these species come in contact with the combustion chamber wall, they cause a condition known as a streaking, blanching or scalloping of the walls. They can also attack the injector orifices, resulting in what is commonly called bell-mouthing.

A further disadvantage of prior art film cooling is that it decreases the efficiency of the rocket engine. The quantity of the propellant used for cooling is significant and, to a substantial extent, its use as a coolant causes it to be lost to the system as propellant. This can result in an appreciable loss of efficiency.

SUMMARY OF THE INVENTION

The present invention provides an improved film cooling method for keeping the combustion chamber wall of a rocket engine cooled. Briefly, the chamber is divided into upstream and downstream sections. The injector and the chamber are constructed so that only unmixed and nondecomposed propellant comes in contact with the upstream section of the chamber and only fully combusted propellant contacts the downstream section. The chamber is further constructed so that all propellant is combusted in the core of the chamber and substantially no propellant is combusted along the chamber walls.

A principal advantage of the invention is that it inhibits chemical reactions between various gas species and the combustion chamber wall. The integrity of the combustion chamber wall is thereby preserved.

Another advantage of the invention is that it enhances the efficiency of the propellant combustion. This is accomplished by deflecting the curtain flow from the chamber wall radially inwardly into the core flow so that the fuel and/or oxidizer which makes up the curtain flow is intimately mixed and fully combusted. The heretofore encountered loss of fuel and/or oxidizer in the curtain flow due to non or incomplete combustion is thereby eliminated. Further, the decomposition and combustion of the curtain flow, which creates the above-discussed chamber wall corroding chemical species, occurs in the core flow, spaced away from the chamber wall so that it can not deteriorate the wall.

A radially inwardly oriented, annular baffle ring protrudes from the inside of the chamber wall and deflects the curtain flow into the core flow. As the curtain flow propagates from the injector to baffle ring, heat from the core flow and the mixture of the core flow with the curtain flow at their boundaries causes the gradual decomposition and partial combustion of the propellant constituent which makes up the curtain flow. This increases from the boundary of the two flows toward the chamber wall as the distance from the injector increases. The baffle is positioned so that the curtain flow is deflected inwardly before decomposition and/or partially combusted products in the curtain flow (hereafter collectively referred to as "decomposition products") reach the periphery thereof, i.e., before such products come into contact with the chamber wall.

Thus, the curtain flow insulates the chamber wall from the injector to the baffle ring from the hot core combustion decomposition products. Chamber wall corrosion and deterioration is thereby minimized or prevented. The cooler curtain flow also permits a greater choice in the selection of materials in the injector to baffle region. It is often desirable to employ materials having low thermal conductivity to further inhibit heat flow from the hot region down stream of the baffle to the injector.

The portion of the chamber downstream of the baffle ring comes into contact with substantially only fully combusted products, i.e., propellant which has already been combusted in the core flow. The decomposition products of the curtain flow are intimately intermixed and combusted within the core flow. Since only combusted propellant comes into contact with the downstream chamber wall, the wall can be constructed of high temperature, thermally highly conductive materials which may be subject to chemical attack by decomposition products but not by fully combusted propellant. This greatly facilitates the construction of the high temperature downstream chamber section for cooling by radiation which requires both high thermal conductivity and a thin wall section for a high rate of heat transfer.

As the foregoing has demonstrated, the present invention effects an efficient cooling of the upstream chamber wall section immediately downstream of the injector and further inhibits heat flow through the selection of low thermal conductivity materials. The transfer of heat through the interface between the chamber wall and the injector can thereby be limited and controlled to prevent vapor locks. The present invention further isolates the upstream chamber wall from the decomposition products, thereby preventing them from chemically attacking and deteriorating or corroding the wall. In the preferred embodiment of the invention, this is accomplished by construction the injector so that only one of the propellant constituents, e.g., either fuel or oxidizer, forms the curtain flow. It is possible, however, to practice the present invention by directing one or more alternating zones of the propellant constituents into the curtain flow. At the axial interfaces between the zones, some fuel and oxidizer can mix and some decomposition product may form and chemically react with the chamber wall. Nevertheless, overall chamber wall deterioration is still greatly reduced as compared to prior art curtain flow systems because the curtain flow is deflected into the core stream before the decomposition products within the zones can reach the chamber wall. In addition, combustion efficiency is greatly improved for the reasons discussed earlier.

BRIEF DESCRIPTION OF THE DRAWING

The drawing is a side elevational view, in cross section, through a rocket engine having an injector, a combustion chamber and a nozzle and it schematically illustrates the present invention.

DESCRIPTION OF THE PREFERRED EMBODIMENTS

Referring to the drawing, a rocket combustor chamber 2, constructed in accordance with the present invention generally comprises an injector 4, a combustion chamber 6 for propellant injected by the injector, and a nozzle 8 through which combusted gasses escape from the chamber, thereby generating the desired rocket thrust.

The injector includes at least several and typically a multiplicity of orifices 10 through which the fuel and oxidizer constituents of the propellant are ejected into the combustion chamber. Fuel and oxidizer are conventionally supplied to the upstream end of the orifices.

The orifices are arranged so the fuel and oxidizer ejected from their respective downstream ends form predefined flow patterns which generate a propellant core flow 12 that propagates in a downstream direction through the combustion chamber 6 and nozzle 8. The core flow supplying orifices are oriented so that fuel and oxidizer impinge and intimately mix a short distance downstream of the injector to initiate and complete combustion in the core stream as soon as possible.

Orifices 10a are arranged along the radially outer portion of the injector. They are oriented to form a curtain flow 16 of preferably either the fuel or the oxidizer constituent of the propellant. The curtain flow is annular in cross-section and envelopes the core flow over its entire periphery.

The combustion chamber 6 is constructed of first and second, upstream and downstream cylindrical combustion chamber walls 18, 20. The walls are joined, for example with a flange 22 suitably secured, e.g., bolted, welded or the like to the chamber walls, and they define a primary combustion chamber 24 immediately downstream of injector 4 and a secondary combustion chamber 26 located generally between the primary chamber and nozzle 8. The upstream end of the first cylindrical wall may include a connector flange 28 for securing it to the injector, forming a heat transferring interface 30 between them.

In the preferred embodiment, the downstream end 32 of the first cylindrical chamber wall 18 is defined by an annular baffle ring 32 which projects radially inwardly from the first chamber wall. In the illustrated embodiment, the baffle ring is integrally constructed with the first chamber wall. Alternatively, it may be secured thereto, as by welding, for example. Moreover, the baffle ring may be positioned slightly upstream of the downstream end of the first chamber wall (not illustrated). In either event, the distance between the injector and an upstream facing deflection surface 36 of baffle ring 34 is dimentioned as is further described below.

In use, propellant flows through the injector 4 into combustion chamber 6 as described above to form a high-temperature core flow in which the propellant is combusted from a point just downstream of the injector. The curtain flow 16 surrounds the core flow and limits the amount of heat that is transferred from the core flow to the first chamber wall 18. For a given design, the radial thickness of the curtain flow is selected to limit the heat transfer from the first chamber wall via interface 30 to the injector and prevent the formation of vapor locks in the injector, or in the supply conduits (not shown) upstream thereof.

The curtain flow is preferably a homogeneous flow of one of the propellant constituents, i.e., the fuel or the oxidizer. It also isolates the first chamber wall from coming into contact, and thereby being attacked by chemically reactive species which initially form at a boundary 38 between the core and curtain flows as the fuel or oxidizer in the curtain flow thermally decompose and become partially combusted under the heat of the core flow. This thermal decomposition and partial combustion of the curtain flow propagates radially outward from the boundary 38 as the curtain flow travels in a downstream direction. The distance between the injector 4 and deflection surface 36 of baffle ring 34 is selected so that the curtain flow is deflected radially inwardly into the core zone before the heat from the core flow, and intermixing between the core flow and the curtain flow at their boundaries, causes the occurrence of chemically reactive species in the peripheral layer of the curtain flow, i.e., before such species can come into contact with the first chamber wall.

The inward deflection of the curtain flow turbulently mixes it with the core flow so as to bring substantially all constituents of the curtain flow into contact with uncombusted or partially propellant combusted constituents in the core flow. This effects the substantially complete combustion of all propellant and maximizes the efficiency of the combustion process by avoiding the discharge of incompletely combusted propellant from the rocket engine as was the case with prior art rocket engines employing film cooling.

As a result of the inward deflection of the curtain flow, the second chamber wall comes in contact with primarily only fully combusted propellant which does not chemically react with many materials, such as molybdenum copper, nickel, gold, platinum, iridium, rhenium etc. well suited for the cooling of the wall. Thus, the material of the second chamber wall can be chosen so that it provides the desired high rate of heat transmission through the wall without having to compromise this objective with an increase of the chamber wall thickness, to compensate for chamber wall corrosion and deterioration.

As the foregoing demonstrates, the present invention conceptually divides the combustion chamber of a rocket engine into coaxial primary and secondary chambers. The first chamber wall forming the primary combustion chamber comes into contact with only the curtain flow and therefore, with only uncombusted propellant. Conversely, the second chamber wall defining the secondary combustion chamber comes into contact with only substantially fully combusted propellant. The rocket engine is thereby effectively cooled, the combustion chamber is protected against chemical attack from the decomposing and combusting propellant, it has a significantly improved combustion efficiency as compared to similarly cooled, though not chemically protected prior art rocket engines, and the respective chamber walls can be constructed of different materials, each best suited to for its particular function.

I claim:

1. A rocket engine comprising:
   a. a primary combustion chamber defined by a first peripheral wall constructed of a first material adapted to withstand a relatively lower temperature;
   b. a secondary combustion chamber defined by a second peripheral wall constructed of a second material adapted to withstand a relatively higher temperature and joined axially to an end of the primary chamber;
   c. a propellant injector joined to another end of the primary chamber having a plurality of orifices for directing a fuel and an oxidizer toward the secondary chamber so that a first portion of fuel and oxidizer forms a core flow through the primary chamber where they mix with each other and so that a second portion of at least one of the fuel and the oxidizer forms an unmixed curtain flow along the first wall; and
   d. means for deflecting the curtain flow from a point on the first wall proximate the one end thereof toward the core flow for mixing the curtain flow with the core flow and causing the full combustion of the at least one of the fuel and the oxidizer in the curtain flow at a location radially inward of the second wall.

2. A rocket engine as in claim 1, wherein the deflecting means comprises an annular baffle projecting radially inward from the first wall.

3. A rocket engine as in claim 1, wherein the first material is a material having a relatively low thermal conductivity.

4. A rocket engine as in claim 1, wherein the second material is a material having relatively high thermal conductivity.

5. A rocket engine as in claim 1, wherein the injector includes means for directing fuel and oxidizer so that the curtain flow comprises predominantly oxidizer.

6. A rocket engine as in claim 1, wherein the injector includes means for directing fuel and oxidizer so that the curtain flow comprises predominantly fuel.

7. A rocket engine according to claim 1, wherein the second wall is shaped and the second material is selected so that the second wall is cooled by radiation from the exterior of the wall.

8. A rocket engine according to claim 1, wherein the injector includes means of forming a curtain flow of a volume sufficient to prevent the formation of a vapor lock in the injector due to a heat transfer from the first wall to the injector.

9. A rocket engine comprising:
   a. a primary combustion chamber defined by a first wall constructed of a first material adapted to withstand a relatively lower temperature;
   b. a secondary combustion chamber defined by a second peripheral wall constructed of a second material adapted to withstand a relatively higher temperature, the first and second walls being axially joined to each other:
   c. a propellant injector joined to the first wall at an end thereof opposite from the second wall, the injector extending transversely across the first wall and including first and second sets of a plurality of orifices for injecting fuel and oxidizer, respectively, into the first chamber in a pattern defining a coreflow of intimately mixed fuel and oxidizer spaced radially inward of the first wall for the oxidization of the fuel as it travels in a downstream direction, and a curtain flow of substantially only one of the fuel and the oxidizer, the curtain flow being disposed between the core flow and the first wall and having a radial thickness and a flow rate sufficient to limit the heat transfer from the core flow to the first wall and to prevent the first wall from coming into contact with partially combusted or decomposed propellant products which have a relatively high propensity to chemically react with the first material to thereby protect the first wall from deterioration and control its temperature; and d. a baffle ring projecting radially inward from the first wall proximate the end thereof joined to the second wall and having a radial extend sufficient to deflect substantially the entire curtain flow reaching the ring into the core flow for combusting the one of the fuel and the oxidizer forming the curtain flow in the core flow at a location spaced radially inward of the first and second walls;

whereby chemical reactions between the second wall and partially combusted or decomposed propellant products is prevented while substantially the entire propellant is combusted in the chamber to enhance the efficiency of the engine.

10. A rocket engine according to claim 9, wherein the baffle ring is positioned relative to the injector where the curtain flow, in cross-section, includes a radially inner portion having thermally decomposed or partially combusted propellant products and a radially outer portion comprising substantially no such products.

* * * * *